Patented May 5, 1936

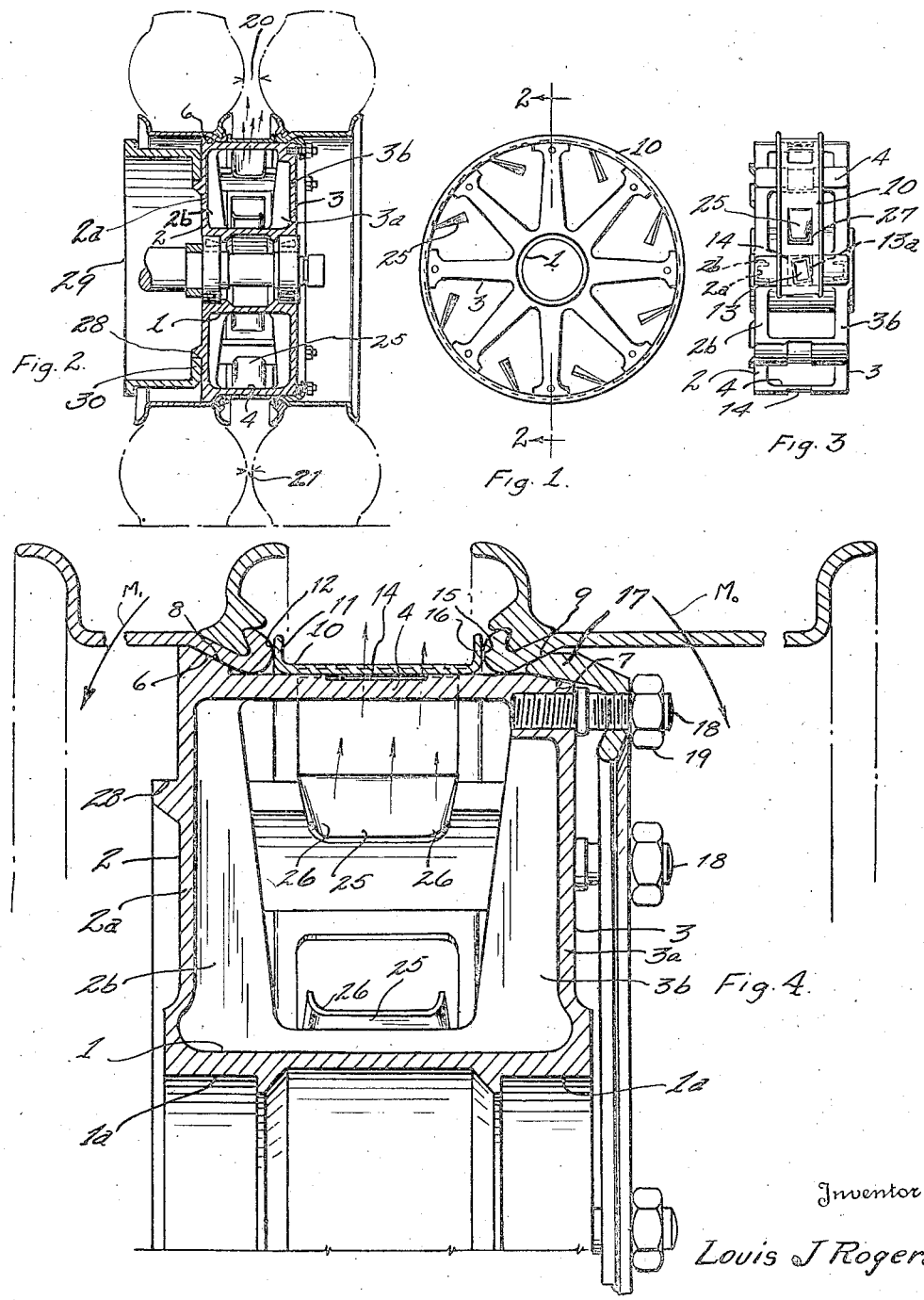

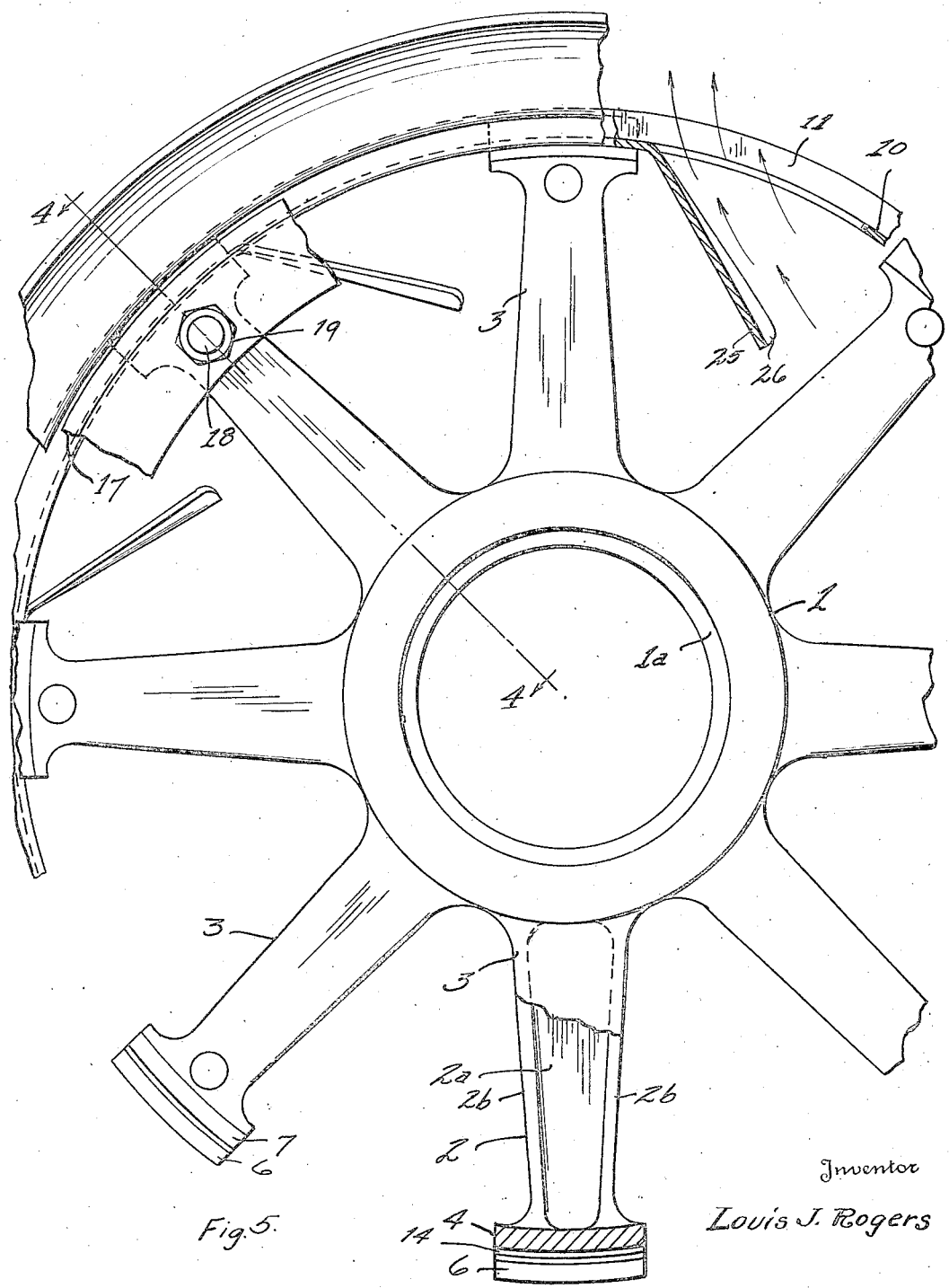

2,039,554

UNITED STATES PATENT OFFICE 2,039,554

VEHICLE WHEEL FOR DUAL DEMOUNTABLE RIMS

Louis J. Rogers, Albion, Pa.

Application October 28, 1933, Serial No. 695,650

3 Claims. (Cl. 301—12)

This invention relates to vehicle wheels and particularly to wheels for heavy duty vehicles, the principal objects being to provide a heavy duty wheel for dual demountable pneumatic tire rims, which wheel is extremely compact and strong in proportion to its weight and in which all stresses are withstood in a manner more effectively than in wheels heretofore used.

An equally important object of the invention is to provide a wheel of this character in which the demountable rims and associated tires may be easily installed or removed while the wheel is in operating position on the vehicle.

Another object of the present invention is to effect cooling of the tires during operation of the vehicle whereby the life of the tires is greatly increased and the dangers from mechanical failure are reduced.

A more specific object is to provide a wheel which may be cast conveniently or in which a larger number of the parts may be standard rolled structural elements thus economically providing great strength with a minimum of weight.

Still another object is to provide a vehicle wheel which will withstand severe side thrusts, in which the braking stresses are efficiently withstood.

Other objects and advantages will become apparent from the following specification, wherein reference is made to the drawings, in which Fig. 1 is a plan view of the wheel taken in a plane normal to the wheel axis;

Fig. 2 is a cross sectional view of the wheel taken on a plane indicated by the line 2—2 of Fig. 1;

Fig. 3 is an elevation of the wheel taken at right angles to the view illustrated in Fig. 1;

Fig. 4 is an enlarged fragmentary sectional view of the wheel taken on the same plane as Fig. 2;

Fig. 5 is an enlarged fragmentary view of the wheel taken on a plane normal to the axis of the wheel, parts thereof being shown in section for clearness in illustration;

Heretofore in the truck or trailer wheels of the dual demountable rim type, it has been the practice to use a single row of spokes engaging the felloe near its midportion, the spokes being flared at the top so as to extend outwardly part way to the felloe margins and being tapered toward the hub and flared again at its point of connection therewith. In wheels of this character, the stress is delivered to the spoke at an angle and likewise is transmitted at a different angle to the hub. Inasmuch as dual demountable rims are usually carried at the inboard and outboard margins of the wheel, the overhang of the rims is greatly augmented relative to the spokes in this type of wheel, and the spokes must be made extremely heavy and large to withstand buckling or twisting under load, especially at their outer ends.

Again in such wheels it is necessary to make provision for the removal of the demountable rims axially of the wheel from the outboard side and consequently, to accommodate the valve stem of the tires on the rims, a transverse passage or slot must be provided in the felloe.

The rims are then held in place by suitable wedges engaging the margins of the felloe, the inboard wedges being provided directly on the felloe and the outboard wedges being detachable. In cooperating these wedges with the rims sufficiently tight to hold the rims in proper positions on the wheel, a terrific stress is developed tending to bend the margins of the felloe inwardly of the wheel and toward its axis and midportion. With the customary arrangement of spokes, the portion of the felloe adjacent the slot which accommodates the valve stems is disposed a considerable distance axially of the wheel from the spokes and also is circumferentially spaced from the spokes. Consequently, the felloe portions between the limits of the slot and the spokes nearest the slot are unsupported for a considerable part of their length. Due to the resulting overhang, these portions of the felloe tend to yield when the wedging pressure is applied so that the rims cannot be held firmly on the wheel along these portions of the felloe and tend to move off center. Attempts have been made to overcome this by providing a heavy U-shaped brace bridging the felloe margins defining the slot but these too have proven unduly cumbersome and unsatisfactory.

In the present wheel, however, all these objectionable features are eliminated, accompanied by a concurrent decrease in the weight of the wheel and by greater economy in construction. Likewise, in the present wheel, the brake band may be positioned with greater clearance relative to the axle mountings on the body and is exposed on its outer surface so as to be cooled more rapidly by the relatively passing air.

Referring to Figs. 1 to 5 inclusive, a wheel for use in connection with a trailer is illustrated, the application thereof to trucks and such vehicles being obvious from such disclosure.

In the form illustrated, the wheel is cast in one piece and comprises a hub 1, on which are mounted a plurality of sets of spokes, for example, an inboard set of spokes 2 and an outboard set of spokes 3, the spokes of one set preferably being aligned transversely of the wheel with the corresponding spokes of the other set. At their outer ends, corresponding aligned spokes of the sets are rigidly connected together by a bridge 4, one bridge to each such pair of spokes, the bridges each terminating circumferentially of the wheel close to the circumferential limits of the ends of the spokes with which associated and being in spaced relation to each other so as to form circumferentially spaced felloe segments. Near the inboard margin of each felloe segment is a wedge surface 6 which slopes radially outwardly of the wheel in the inboard direction. At the outboard margin of each felloe segment is a wedge surface 7 which slopes radially inwardly of the wheel in the outboard direction.

The wheel illustrated is particularly adapted for use in connection with a type of dual demountable rims which are now in general use and which are such that either rim may be used interchangeably as the inboard or outboard rim, each rim and the tire carried thereby being removable while assembled.

Referring particularly to Fig. 4, each rim has at one margin a wedging shoulder sloping toward the rim axis from the inner limit of the margin to the closer edge of the rim. These shoulders, designated for convenience on the inboard rim as 8 and on the outboard rim as 9, are adapted for securing the rims in place on the wheel felloe. Referring first to the inboard rim, this rim is slid onto the wheel felloe from the outboard face of the wheel with the wedging shoulder 8 at its outboard margin and moved in the inboard direction until the shoulder 8 engages the wedge surfaces 6 at the inboard margin of the felloe segments. Next an annular spacing ring or spacer 10 is slid onto the wheel from the outboard face and rests on the midportion of the felloe segments with its inboard edge 11 engaging the outboard edge 12 of the inboard rim. As is customary on such spacers, the metal is distorted radially inwardly at one portion a slight amount to form on the under face a wedging boss 13. The felloe segments are provided with aligned circumferentially extending channels or troughs 14 in which the boss 13 may be entered circumferentially of the wheel. The spacer is disposed on the felloe segments with the boss 13 intermediate the felloe segments and aligned circumferentially with the troughs 14 and is then slid around the wheel so as to engage a suitable wedging surface 13a of the boss with a portion of the outboard wall of one of the trough portions 14. This surface 13a is so positioned that upon continued rotation of the spacer 10, engagement between the wedging surface 13a of the boss 13 and the outboard wall of the trough 14 wedges the spacer 10 in the inboard direction, thus forcing the inboard rim into cooperative relation with the wedge surfaces 6 and holding the same snugly in such position until the outboard rim can be secured on the wheel.

The outboard rim is next placed on the wheel from the outboard face with the wedging shoulder 9 disposed at the inboard margin of the rim and is forced axially on the rim until its inboard edge 15 engages the outboard edge 16 of the spacer. A suitable lug means is then inserted intermediate the wedging surfaces 7 of the felloe segments and the wedging shoulder 9 of the outboard rim for forcing the rim in the inboard direction and wedging it in place on the wheel. This lug means may comprise a series of separate lugs engageable, as described, at circumferentially spaced portions of the rim or may comprise the usual annular band having a continuous lug portion, as indicated at 17, which is adapted to be received between the surfaces 4 and 9. Suitable locking bolts 18 are carried by the wheel, preferably at the felloe segments and in the outer ends of the spokes, the bolts protruding in the outboard direction beyond the outboard edge of the felloe, so as to be received in suitable openings in the lug means 17. Nuts 19, in threaded engagement with the outer ends of the bolts 18, are utilized for forcing the lug means in the inboard direction and for holding said means in the final wedging position. Obviously, as the nut 19 is operated to force the lug means in the inboard direction, the outboard rim is forced in this direction moving the inboard rim in the inboard direction through the medium of the spacer 10 to effect a stressed wedging engagement between the surfaces 6 and 8. Consequently, engagement between the surfaces 9 and 7 of the complementary surfaces on the lug means 17 wedges the outboard rim firmly into operating position, as illustrated in Fig. 4.

Referring to Fig. 2 it will be noted that the rims are spaced sufficiently far apart so that the tires accommodated thereon are normally in spaced relation to each other as indicated at 20, this distance being such that the portions of the tires supporting the load may yield and bulge transversely of the vehicle without touching each other, thus leaving them in spaced relation even at the load bearing portion, as indicated at 21. It will be noted that when the rims are installed in this manner, the greater portion of each rim overhangs the corresponding face of the wheel and is supported on the wheel only by one margin. Consequently, when the vehicle is loaded, the wheel is subjected to severe bending moments in the direction indicated by the arrows Mo and Mi. These moments so directed as to tend to twist the margin of the felloe segments toward the axis and midportion of the wheel. Furthermore, the direct thrusts from the rims to the wheel are delivered at the outer margins of the felloe segments.

In order to withstand these bending moments and to more effectively withstand the direct radial thrusts, the two sets of spokes are provided. Each spoke of the inboard set is the same and comprises a body portion 2a which preferably lies in the plane defining the inboard limit or face of the wheel and which extends a substantial distance circumferentially of the wheel. Extending from the body portion 2a transversely of the wheel toward its mid-portion are reinforcing means, such as the flanges 2b, the spokes thus being of channel cross section with the open face disposed toward the midportion of the wheel. Transversely of the wheel, each spoke is positioned with its outer end in direct radial alignment with the surface 6 of its felloe segment and extends directly to the hub 1.

The hub 1 is provided with bearing races 1a adapted to receive suitable bearings for transmitting the load from the hub onto the axle. The inboard bearing race 1a of the hub lies preferably in the same plane as the wedging surface 6 of the felloe segments and the spokes 2 engage the hub directly over the bearing race and engage the felloe segments directly under the wedge surfaces 6. Thus the inboard spokes extend at right angles to the hub from over the bearing race thereof to the wedge surfaces 6, any radial thrust delivered to the wheel from the inboard rim are transmitted fully and in a direct line to the inboard bearings of the wheel. The outboard spokes each likewise comprises a body portion 3a with reinforcing flanges 3b extending therefrom toward the midportion of the wheel and likewise are positioned relative to the outboard bearing race 1a and the outboard rim wedging surface 4 of the felloe in a manner similar to the inboard spokes, so that thrusts from the outboard rim are delivered directly to the outboard bearings of the hub. Since the sets of spokes are spaced apart transversely of the wheel and pass directly to the corresponding bearing races, the hub intermediate the bearing races may be of very light construction, sufficient only to retain grease therein, and no excess metal is needed in the spokes or hub. If desired, the respective bearing races and associated wedging surfaces may be positioned in different planes in which case the spokes will not extend at right angles to the hub or felloe means. In either event, it is desirable that they extend substantially directly from the bearing races to the respective wedging surfaces so as to deliver the thrust more directly.

Another distinct advantage resulting from the particular type of spokes utilized resides in their ability to withstand the moments Mo and Mi. For example, referring to the moment Mo, such a bending moment tends to twist the outboard margin of the felloe in a clockwise direction, thus throwing the body 3a of the outboard spokes under compression. Since each spoke is channel-shaped in cross section, it is extremely rigid and will withstand a heavy compressive stress. The inner margins of the flanges 3b are correspondingly thrown under tension. However, a very small amount of metal will withstand a tension stress comparable to what can be withstood by a much larger amount of metal under compressive stress. Since in the form here illustrated, the greater portion of the metal of the spokes is disposed where it will receive the compressive stress, a lesser amount being required for tension, all the metal is effectively utilized.

When the lug means 17 is forced into place, this likewise develops a very severe compressive stress on the spokes, but since the spokes are directly thereneath and extend therefrom directly in the direction of thrust and directly to the hub, this stress is transmitted directly to the bearings in the hub and does not have to follow an angular or curvilinear path such as heretofore has been used. Consequently there is less tendency for the spoke to buckle or bend and the weight of all such elements may be greatly reduced as compared to spokes which transmit the thrust along a curvilinear course. Again, since the portion of the spoke initially receiving the thrust is not in overhanging relation to the intermediate load transmitting portion, a much lighter weight spoke may be used.

Referring next to the cooling of the tire, it is well known that when a truck or trailer vehicle is driven at high speed, especially when loaded, that the constant flexing of the rubber tire casings as they are bulged when meeting the ground and return to their normal positions, develops a deleterious heat. Furthermore, when the wheel is rotated, it appears to be almost impossible for the air normally moving past the wheel to enter between the tires even when openings through the felloe are provided, due largely, it is believed, to the centrifugal force imparted to the air by the rough configuration of the sides of the tires.

In order to insure a flow of air between the tires to cool the same, a number of fan blades 25 are provided intermediate the felloe segments, these blades preferably being inturned toward the wheel axis and disposed at an angle sloping from their inner ends outwardly of the wheel in a direction opposite to the direction of travel, as illustrated in Fig. 5. Each of the blades is preferably dished slightly, as indicated at 26, so as to more effectively scoop up the air which is impinged thereon. The spacer 10 is provided with suitable openings aligned radially of the wheel with the fan blades 25 so that the air impinged on the fan blades is driven by the blades radially outwardly through the spacer and between the tires. If desired, the blades may be arranged to draw the air inwardly and discharge it axially of the wheel but this is not as satisfactory as it is difficult to cause the air to reach the blades initially.

With the blades arranged as shown however, a sufficient quantity of air is circulated between the tires to effect cooling especially when transversely spaced sets of spokes are used. As the wheel advances along the roadway there is a large surge of air around the inboard and outboard faces, more particularly the former, which eddies transversely of the wheel, especially toward the trailing portion and thus is easily caught by the blades and discharged between the tires. However, the present invention is not to be limited to the particular direction of circulation described, as it appears that heretofore no special circulating means have been provided to cool tires by effecting circulation of air consequent upon rotation of the wheel.

A satisfactory and economical manner of providing such blades without adding additional weight to the wheel is to form the same on the spacer 10, though, if desired, they may be made directly on the wheel. For example, circumferentially spaced portions of the spacer may be cut loose from the main body around three sides and then bent inwardly of the spacer, as indicated at 27. When provided on the spacer, the blades 25 are positioned so that they may be passed between the felloe segments as the spacer is moved in the inboard direction and are also so positioned relative to the boss 13 that rotation of the spacer sufficient to effect the wedging engagement of the boss 13 is possible without striking adjacent felloe segments with the blades.

It is apparent that spokes such as described will also withstand severe circumferentially directed stresses resulting from application of the braking pressure on the wheel. However, it is desirable to reduce this braking stress additionally and for accomplishing this purpose a brake drum is installed having a more effective relation with the wheel than heretofore used. On the inboard face of the inboard spokes are shoulders 28 which are adapted to receive the brake drum 29 and center the same relative to the wheel axis. The brake drum, at the face abutting the spokes 2, is provided with a flat annular flange 30 adapted to lie in face to face relation to the adjacent faces of the spokes when the brake drum is disposed on the shoulders 28. Thus the brake drum may be held securely in place by spot welding or by bolting the spokes and flange 30 together, the latter being preferable so as to render the brake drum more easily replaceable in case of damage or wear.

The flange 30 is positioned to engage the spokes radially outwardly beyond their midportions so that the braking torque is transmitted almost directly from the braking drum to the felloe or rims and not delivered near the base of the spoke. Consequently, the spoke at the base is not subjected to the additional stress resulting from application of braking torque delivered at the end of a long lever arm.

It is apparent that with the form of wheel described, the overall width of the wheel and brake drum is very greatly reduced and further that the rims may be installed from the outboard face in substantially any position circumferentially, as the valve stem of the inboard tire may pass readily between any two adjacent felloe segments.

It is apparent from the foregoing description that I have provided a wheel for dual demountable rims which is not only light and durable and economical to manufacture but effectively accomplishes the purposes above set forth.

Having thus described my invention, I claim:

1. A wheel comprising a hub, spokes extending radially therefrom and felloe means carried by said spokes and arranged to receive an inboard rim and an outboard rim axially of the wheel and to support said rims in spaced relation, tires on said rims respectively, a spacer receivable on said felloe means axially of the wheel intermediate said rims, said spacer being open intermediate its outer limits, and fan blades carried by said spacer and operable consequent upon rotation of the wheel to circulate air radially between said tires.

2. A spacer for the purposes described comprising a body portion, a plurality of circumferentially spaced tongue portions of said body being severed part way around their limits from the remainder of the body and said severed tongue portions being turned inwardly toward the axis of the spacer and supported by their unsevered portion at an angle to the radius of the spacer, whereby said tongue portions form fan blades for circulating air radially of the spacer when the spacer is revolved about its axis.

3. In a wheel for dual demountable rims comprising a hub, spokes extending therefrom and felloe means carried by the spokes and arranged to receive an inboard rim and an outboard rim axially of the wheel and to support said rims in spaced relation, a detachable annular spacer receivable on said felloe means axially of the wheel between the rims, and fan blades on said spacer operable consequent upon rotation of the wheel to circulate air.

LOUIS J. ROGERS.